Figure 2:
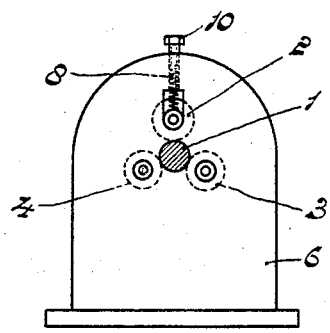

July 14, 1959 H. P. STAL 2,894,401
DEVICE FOR IMPARTING AN AXIAL AND A ROTARY
MOVEMENT TO A SHAFT
Filed Aug. 12, 1954 2 Sheets-Sheet 1

INVENTOR
HENRICUS PETRUS STAL

BY Fred En. Vogel
AGENT

July 14, 1959  H. P. STAL  2,894,401
DEVICE FOR IMPARTING AN AXIAL AND A ROTARY
MOVEMENT TO A SHAFT
Filed Aug. 12, 1954  2 Sheets-Sheet 2

INVENTOR
HENRICUS PETRUS STAL

BY Fred M. Vogel
AGENT

United States Patent Office 2,894,401
Patented July 14, 1959

2,894,401

DEVICE FOR IMPARTING AN AXIAL AND A ROTARY MOVEMENT TO A SHAFT

Henricus Petrus Stal, Eindhoven, Netherlands, assignor, by mesne assignments, to North American Philips Company, Inc., New York, N.Y., a corporation of Delaware Application August 12, 1954, Serial No. 449,466

Claims priority, application Netherlands August 12, 1953

8 Claims. (Cl. 74—99)

The invention relates to a device for imparting not only an axial but also a rotary movement to a shaft which is free to move in the axial direction. Such a device may, for example, be used if the shaft has a work piece secured to it in which a helical groove is required to be recessed, as may be the case in the manufacture of electric resistances. The device may also be used for coil winding. According to the invention the said device is characterized in that the shaft is enclosed between three dumb-bell-shaped bodies adapted to rotate about their longitudinal axis which cause the shaft to be displaced and, as the case may be, to rotate and the longitudinal axes of which cross the centre line of the shaft required to be displaced at a same angle, whilst the circumference of each thickened spherical end of each dumb-bell-shaped body engages with the shaft. The device according to the invention can be manufactured in a simple manner and permits a high degree of accuracy to be obtained. Experiment has shown that the pitch of the helical groove produced by means of the device does not vary by more than 6 microns in successive identical work pieces.

In a further embodiment according to the invention the axial movement per unit of time of the shaft is adjustable in that provision is made of means capable of varying the angle at which the longitudinal axes of the dumb-bell-shaped bodies are to the centre line of the shaft required to be displaced. The axial movement per unit of time increases with increase of this angle and decreases with decrease of the angle. The angular variation of the dumb-bell-shaped bodies may be effected in various ways; in a preferred embodiment according to the invention the longitudinal axes of the dumb-bell-shaped bodies on one side are journalled so as to be rotatable in a stationary support whilst on the other side they are supported so as to be rotatable by spherical bodies the centre of which is coincident with the centre of the spherical end of the supported dumb-bell-shaped member, the spherical bodies in turn being journalled so as to be rotatable in a support capable of effecting an adjustable rotation relatively to the stationary support.

In this embodiment of a device according to the invention it is ensured that the angle at which the centre lines of the dumb-bell-shaped body are to the centre line of the shaft is increased or decreased in the same degree for each dumb-bell-shaped body on rotation of the support. It is advantageous, if in a further embodiment according to the invention two of the dumb-bell-shaped bodies on one side are journalled so as to be rotatable in a stationary support and on the other side are supported so as to be rotatable by spherical bodies the centre of which is coincident with the centre of the spherical end of the supported dumb-bell-shaped member, the said spherical bodies in turn being journalled so as to be rotatable in a support capable of effecting an adjustable rotation relatively to the stationary support, whilst the third dumb-bell-shaped body is journalled not only in the stationary support but also in the support capable of rotation in a manner such as to enable it to effect a radial movement parallel to its longitudinal axis.

Consequently this embodiment of the invention enables the shaft to become disengaged from the dumb-bell-shaped bodies at a desired instant.

The rotary movement of the shaft also may be effected in various manners; it is, for example, possible to drive a dumb-bell-shaped body which drives the shaft. However, in a preferred embodiment of the invention the rotating shaft is separately driven at uniform speed.

When the rotating shaft has reached the end of its axial movement, it must be returned to its initial position. In one embodiment according to the invention this is effected in a manner such that provision is made of means capable of moving the third movable dumb-bell-shaped body radially outwards at the termination of the axial movement, thus permitting the shaft to be returned to the initial position of the axial movement, whereupon the dumb-bell-shaped body is again caused to engage with the shaft.

This return may also be effected by driving one of the dumb-bell-shaped bodies and periodically changing the direction of this drive. However, in a preferred embodiment of the invention the direction of the drive of the rotating shaft is periodically changed.

According to a further embodiment of the invention a machine tool, more particularly a grinding machine for recessing helical grooves in work pieces, is characterized in that the machine comprises a device as described hereinbefore, the work-piece being secured to the shaft which rotates and moves axially.

Figure 1:
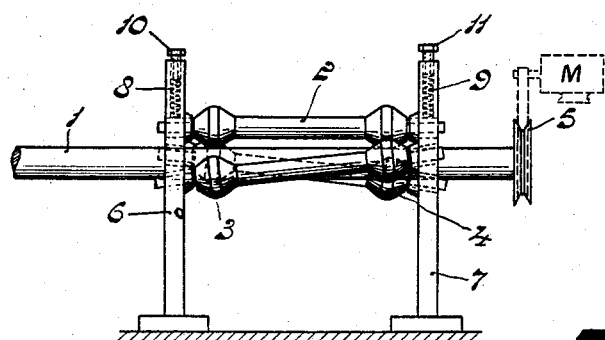
Figure 3:
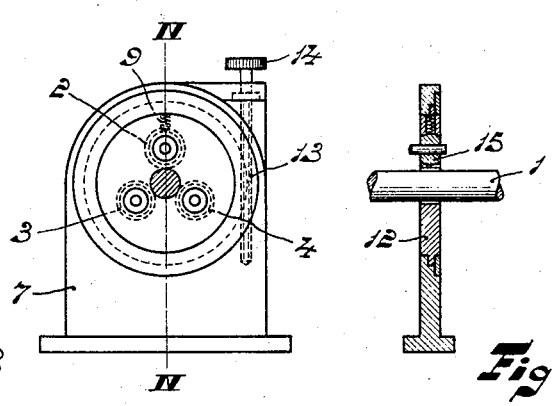
Figure 4:
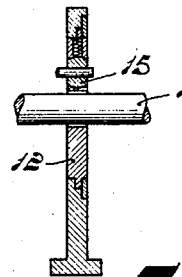

The invention will now be explained with reference to the accompanying drawing, in which Fig. 1 is an elevation of a device for imparting an axial and a rotary movement to a shaft, Fig. 2 is a side elevation of one of the supports shown in Fig. 1, Fig. 3 is a side elevation of a support in which the bearings are capable of rotation, Fig. 4 is a cross-sectional view of the support shown in Fig. 3 taken along the line IV—IV.

Figure 5:
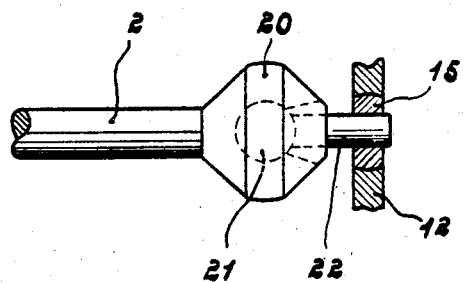
Figure 6:
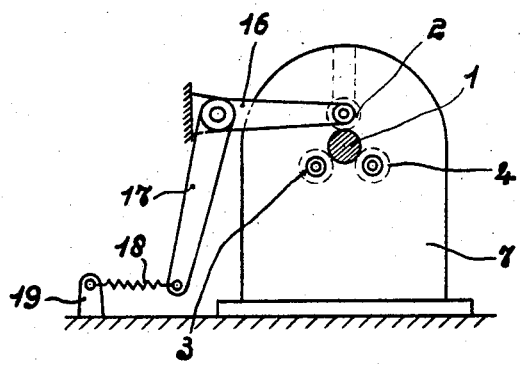

Fig. 5 shows a support of an adjustable dumb-bell-shaped body on an enlarged scale, and Fig. 6 shows an alternative embodiment of a support.

All the figures are to be considered as embodiments given by way of example only.

Referring now to the figures, a shaft to which not only a rotary but also an axial movement is required to be imparted is designated 1. This shaft is enclosed between three dumb-bell-shaped bodies 2, 3 and 4 the centre line of which cross the centre line of the shaft 1 at a small angle. In addition, the shaft 1 shown in Fig. 1 has a rope pulley 5 mounted on it. The dumb-bell-shaped bodies are journalled in two supports 6 and 7 and in order to obtain a satisfactory journalling of the shaft 1 the dumb-bell-shaped body 2 is loaded by two springs 8 and 9 arranged in the body of the supports 6 and 7, which springs may be adjusted by screws 10 and 11. If the shaft 1 is driven by means of the rope pulley 5 and motor M, the latter being shown in dotted lines, not only a rotary movement but also, due to the oblique arrangement of the dumb-bell-shaped bodies 2, 3 and 4, an axial movement will be imparted to this shaft and this axial movement has proved to be not only constant per unit of time but also always satisfactory within narrow limits.

If the speed of the axial movement per unit of time is required to be varied, the support 7 may be designed as shown in Figs. 3 and 4. In this case the dumb-bell-shaped bodies 2, 3 and 4 are not journalled in the body 7 itself, but in a wheel 12 enclosed in this support 7 and capable of a slight rotation therein. This rotation may be effected in that part of the circumference of the wheel 12 is provided with teeth which engage with a worm wheel 13 which is driven by a knob 14. When the knob 14 is rotated, the wheel 12 together with the bearings 15 arranged therein will slightly rotate, with the result, that the position of the bodies 2, 3 and 4 relatively to the shaft is changed. In this case it is desired for the journalling of the dumb-bell-shaped bodies one part of which is designated 15, to be effected in a different manner, for example, as shown in Fig. 5.

In this figure, 2 again designates a dumb-bell-shaped body comprising a spherical end 20. The spherical end encloses a spherical body 21 the centre of which coincides with the centre of the spherical end 20. The spherical body 21 has a shaft 22 secured to it which is journalled in the bearing 15 shown in Fig. 4 which in itself is spherical also and consequently capable of rotation in the support 12. As a result the relative spacing between the centre line of the shaft and the centre line of each dumb-bell-shaped body remains constant when the angle is varied.

It will be appreciated that it is not necessary for the shaft to be driven, as is shown in Fig. 1; as an alternative the dumb-bell-shaped body 2 may, for example, be driven, in which case a rotary and axial movement of the shaft 1 is likewise obtained. When the rotation of the shaft 1 or of the body 2 is reversed, the shaft will move in the opposite direction axially and rotationally. However, sometimes it is desired neither to change the direction of rotation of the shaft nor to drive one of the dumb-bell-shaped bodies, whilst the shaft has to be returned to its original position after completion of the axial movement. In this event, as is shown in Fig. 6, it is not possible for the dumb-bell-shaped body to be journalled in the support 7, but it is journalled in a separate lever 16 to which a rod 17 is secured which is pulled by a spring 18 to a stationary point 19. A pressure exerted on the lever 17 in the direction of the body 7 causes the shaft 1 to be disengaged from the bodies 3 and 4 with the result that it can be returned to its initial position without difficulty.

Furthermore it is possible for a support as shown in Fig. 6 to comprise a construction of the kind shown in Figs. 3, 4 and 5, thus enabling the axial movement per unit of time to be varied also. It is also possible by means which are simple and known in the art to design the device such that a displacement of the lever 17 automatically results in an axial return of the shaft 1.

If the device comprises means to vary the angle at which the dumb-bell-shaped bodies are relatively to the shaft whenever the shaft has travelled a pre-determined, preferably adjustable distance, the shaft, which in itself invariably rotates in the same direction, may, for example, be caused to reciprocate, in which event a proper choice of the angles even permits of arranging the speed in one direction to be different from that in the other direction. Obviously it is also possible to obtain a standstill.

What is claimed is:

1. A device for imparting both rotary and axial movement to a shaft member driven by an outside power source comprising a pair of spaced supports, said shaft member being loosely journalled therethrough, at least three dumb-bell shaped members journalled in said spaced supports, each member being rotatable about its longitudinal axes, said dumb-bell shaped members engaging said shaft member to cause the latter to be axially displaced while it is rotating, the longitudinal axes of at least two of said dumb-bell shaped members positioned askew relative to the center line of said displaceable shaft member, and a part of circumference of each dumb-bell shaped member engaging a portion of said shaft member.

2. A device as set forth in claim 1 further comprising means for varying the angle of the longitudinal axes of the dumb-bell shaped member relative to the center line of said shaft member thereby adjusting the axial movement of said shaft member per unit of time.

3. A device for imparting both rotary and axial movement to a shaft comprising a pair of spaced supports one of said supports having a laterally projecting shaft with an enlarged end portion, said shaft being loosely journalled through said spaced supports, at least three dumb-bell shaped members journalled at one end in one of said spaced supports, each of said members being rotatable about its longitudinal axes and each of said members having a spherical body at the other end thereof, the center of said spherical body coinciding with the center of said enlarged portion of said laterally projecting shaft in the adjacent support, each of said spherical bodies being journalled for rotation on the enlarged end portions of the respective laterally projecting shaft thus effecting an adjustable rotation of said member relative to said spaced supports, said members engaging said shaft to thereby cause the latter to be axially displaced while rotating, the longitudinal axes of at least two of said dumb-bell shaped members being askew with respect to the center line of said displaceable shaft, and the circumference of the spherical body on each dumb-bell shaped member engaging a portion of said shaft.

4. A device as set forth in claim 3 further comprising a rotatable support bearing wherein two of said dumb-bell shaped members on one side are rotatably journalled in one of said supports and on the other side rotatably supported by said rotatable support bearing, said support bearings also being journalled thereby being rotatable in one of said supports said spherical bodies being capable of effecting an adjustment relative to the other of said supports which is stationary, said third dumb-bell shaped member being journalled in both said stationary support and said rotatable support bearing whereby said third dumb-bell shaped member is capable of effecting a radial movement parallel to its longitudinal axis.

5. A device as set forth in claim 3 wherein said rotating shaft is separately driven at a uniform speed.

6. A device as set forth in claim 3 further comprising means for moving said third dumb-bell shaped member radially outwardly on termination of the axial movement of said rotating shaft, said shaft being returned to the initial position of said axial movement whereupon said third dumb-bell shaped member is reengaged with said shaft.

7. A device as set forth in claim 3 wherein the direction of the drive of said rotating shaft is changed periodically.

8. A device as set forth in claim 3 wherein means are provided for varying the angles at which said dumb-bell shaped members are positioned relative to said shaft.

References Cited in the file of this patent

UNITED STATES PATENTS

| 2,152,518 | Wolff | Mar. 28, 1939 |
| 2,204,638 | Weathers | June 18, 1940 |
| 2,368,886 | Schroeter | Feb. 6, 1945 |
| 2,441,168 | Richardson | May 11, 1948 |
| 2,488,256 | Anderson | Nov. 15, 1949 |

FOREIGN PATENTS

| 510,771 | Belgium | May 15, 1952 |